United States Patent [19]

Kokx

[11] Patent Number: 4,792,178
[45] Date of Patent: Dec. 20, 1988

[54] TRUCK TONNEAU COVER ASSEMBLY

[75] Inventor: Paul G. Kokx, Sylvan Lake, Mich.

[73] Assignee: Rolltop, Inc., Sylvan Lake, Mich.

[21] Appl. No.: 87,145

[22] Filed: Aug. 19, 1987

[51] Int. Cl.$^4$ .................................................. B60P 7/04
[52] U.S. Cl. ........................................ 296/98; 296/100; 160/266
[58] Field of Search ............. 296/98, 100 (U.S. only), 296/219 (U.S. only); 160/266, 270

[56] References Cited

U.S. PATENT DOCUMENTS

| Re. 24,765 | 1/1960 | White | 403/139 |
|---|---|---|---|
| 1,893,350 | 1/1933 | Austin | 296/219 |
| 2,594,910 | 4/1952 | Germann | 296/98 |
| 2,967,733 | 1/1961 | Amerine | 296/98 |
| 3,086,811 | 4/1963 | Hartviksen | 296/98 |
| 3,146,824 | 9/1964 | Veilleux | 160/23 R |
| 3,759,568 | 9/1973 | Unruh | 296/98 |
| 4,046,416 | 9/1977 | Penner | 296/98 |
| 4,138,154 | 2/1979 | McKeon | 296/98 |
| 4,252,362 | 2/1981 | Campbell | 296/98 |
| 4,479,677 | 10/1984 | Gulette et al. | 296/98 |
| 4,563,034 | 1/1986 | Lamb | 296/98 |
| 4,611,848 | 9/1986 | Romano | 296/98 |

Primary Examiner—Dennis H. Pedder
Attorney, Agent, or Firm—Brooks & Kushman

[57] ABSTRACT

A truck tonneau cover assembly (10) of the rollable storage type is disclosed as including a pair of elongated guides (22) and a cover (36) with slats (44) that move along converging front ends of the guides to provide the cover with an upwardly curved shape upon unrolling from a storage roll (34) so as to thereby be capable of shedding water. Enlarged side edges (38) of the cover (36) are received within grooves (24) of the guides with the cover extending through restricted guide slots (26) into these grooves to seal the cover edges and prevent the shed water from entering the truck bed (12) with which the cover assembly (10) is utilized. The guides (22) also have rear ends (30) that diverge such that the rear edge of the closed cover is straight and thus sealable with the vehicle truck tailgate (20). Antifriction bearings (48) mount the slats (44) on the guides (22) for forward and rearward movement along the truck bed.

20 Claims, 3 Drawing Sheets

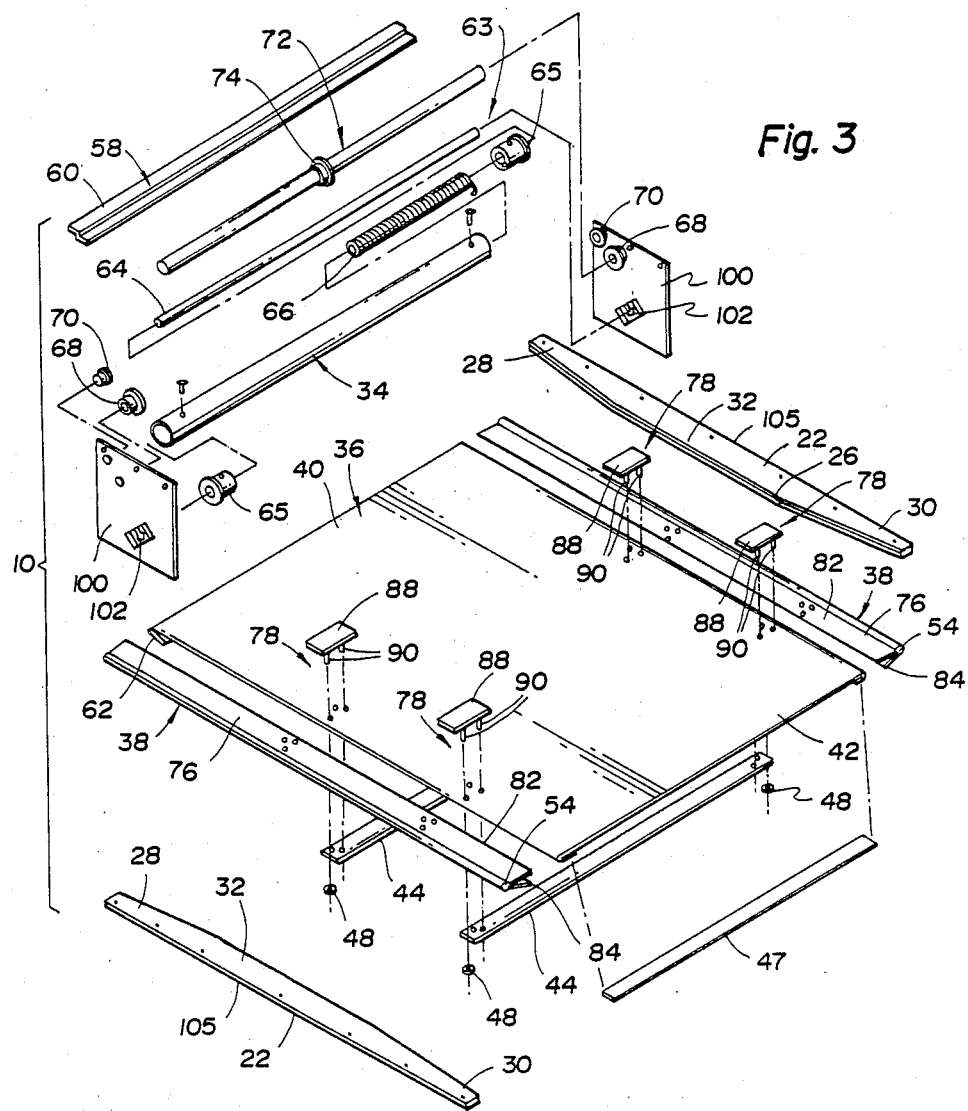

TRUCK TONNEAU COVER ASSEMBLY

TECHNICAL FIELD

This invention relates to a truck tonneau cover assembly for opening and closing a truck bed.

BACKGROUND ART

Truck tonneau cover assemblies have previously been utilized to open and close truck beds at the upper extremities of lateral side walls, a front wall, and a rear tailgate that cooperatively define the truck bed. Such cover assemblies enclose cargo being carried and also enclose the truck bed from the environment even when the truck bed is empty.

Truck tonneau cover assemblies have previously included covers that are unrolled for use to close the associated truck bed and rolled for storage when the truck bed is to be opened. See U.S. Pat. No. 3,086,811 Hartviksen; U.S. Pat. No. 3,146,824 Veilleau; U.S. Pat. No. 4,252,362 Campbell; and U.S. Pat. No. 4,611,844 Romano. Another truck tonneau cover assembly disclosed by the U.S. Pat. No. 4,479,677 of Gullette et al. has a cover that is wound and unwound for storage and use and is also provided with curved slats that are positioned below the unrolled cover in order to provide an upwardly curved shape for shedding water. At its lateral edges, the cover has snaps which are secured to provide sealing of the cover over the truck bed. A further truck tonneau cover assembly of the rollable type is disclosed by the U.S. Pat. No. 2,594,910 of Germann and includes tracks that converge toward each other and receive opposite edges of the cover which has slats with opposite ends also received by the tracks. Converging portions of the track curve the ribs and the cover upwardly to shed water. There is no seal provided between the lateral edges of the cover and the track such that rainwater or other moisture is not prevented from entering the truck bed with the cover closed.

DISCLOSURE OF INVENTION

An object of the present invention is to provide an improved truck tonneau cover assembly including a cover of the rolling storage type which is curved upwardly in its closed position to shed water and has side edges that seal with guides on the side walls of the associated truck bed so as to thereby seal the truck bed from the intrusion of water.

In carrying out the above object and other objects, the truck tonneau cover assembly of the invention provides opening and closing of a truck bed of the type having side walls defining lateral sides, a front wall, and a rear tailgate. The tonneau cover assembly includes a pair of elongated guides respectively mountable on the truck bed sides so as to extend forwardly and rearwardly generally between the front wall and the tailgate. Each guide has an elongated groove extending along its length and an inwardly oriented restricted slot into the groove. Each guide has a front end where the groove and slot thereof extend outwardly in a forward direction adjacent the front wall and also has a rear end located adjacent the tailgate. The guides have intermediate portions which are located closer to each other than the front ends of the guides. Adjacent the front ends of the guide, a storage roll is mountable adjacent the front wall extending generally between the lateral sides of the truck bed. A flexible sheet like cover of the assembly has enlarged side edges that are respectively received within the grooves of the guides with the cover extending through the slots so as to be supported for movement by the guides in a sealed relationship. The cover has a front edge that is rolled up on the storage roll to store the cover and open the truck bed to the environment. The cover also has a rear edge that is pulled rearwardly to unroll the stored cover and thereby close the truck bed. Bendable slats of the cover assembly extend laterally between the side edges of the cover with sufficiently long lengths so as to be bowed upwardly between the intermediate portions of the guides in order to curve the closed cover upwardly so as to shed water which is prevented from entering the truck bed by the sealing of the side edges of the cover with the guides.

In the preferred construction of the cover assembly, the guides also include rear ends that extend outwardly in a rearward direction such that the rear edge of the closed cover is straight in the closed position and thus can effectively seal with the tailgate.

Antifriction bearings are also preferably utilized to mount the slats on the guides for forward and rearward movement along the truck bed and thereby facilitate such movement by reducing the friction involved. Each guide preferably includes upper and lower flanges above and below the restricted slot thereof to guide the antifriction bearings of the slats for movement with the slats in the upwardly bowed position that allows the cover to shed water.

In the preferred construction of the cover assembly, the enlarged side edges of the cover include cords received within the grooves of the guides. These cords are disclosed as having front ends that are separated from the side edges of the cover adjacent its front edge. These separated front ends of the cords extend to the storage roll for winding and unwinding with respect to the storage roll. A retainer of the cover assembly is mountable on the front wall of the truck bed to secure the front edge of the closed cover, and the front edge of the cover is releasable from the retainer to permit rolling storage thereof on the storage roll along with the cords. A pair of guide rolls are preferably mounted on the lateral sides of the truck bed adjacent its front wall, and each cover cord extends between the adjacent pair of guide rolls to the storage roll to provide winding storage thereon under the bias of a winding spring as the cover is stored to open the truck bed.

A positioning roll of the cover is mountable between the lateral sides of the truck bed and is preferably supported by extending between one of the guide rolls of each pair. The positioning roll has a central positioning disc that flexes the slats in an upward direction upon rearward movement along the front ends of the guides so as to thereby insure the properly upwardly curved direction of the cover.

As disclosed, the cover assembly preferably has its cover provided with a pair of side edge reinforcements that attach the cords. The slats of the cover assembly have end connections secured to the cover at the edge reinforcements, and the antifriction bearings of the slats are mounted by the end connections thereof for movement along the guides. Each edge reinforcement preferably includes plastic that facilitates sliding of the cover edges within the grooves of the guides. The slats are preferably located below the cover and have ends secured by the end connections to the cover edges at the edge reinforcements. Each slat end connection includes a connection member located above the cover and at least one connector extending from the connection member through the adjacent cover side edge and edge reinforcement to the associated slat end. Another connector of each slat end connection extends from the connection member through the adjacent cover side edge and edge reinforcement to the antifriction bearing of the associated slat end connection to mount the bearing.

In the preferred construction, the cover assembly includes a pair of support plates that mount the storage roll and the positioning roll as well as supporting the pair of guide rolls between which the pair of cover cords extend for winding on the storage roll.

Each elongated guide is preferably manufactured as an extrusion from a suitable material such as aluminum or plastic to provide its groove, restricted slot, upper and lower flanges, and a support arm which mounts the guide on the associated truck bed side wall. After the extrusion, the guides are bent to form the front and rear ends and the support arm of each guide is then trimmed so as to be straight.

Each slat is preferably made of glass fibers embedded in synthetic resin so as to be lightweight but nevertheless of high strength.

The objects, features, and advantages of the present invention are readily apparent from the following detailed description of the best mode for carrying out the invention when taken in conjunction with the accompanying drawings.

BRIEF DESCRIPTION OF DRAWINGS

FIG. 3 is an exploded perspective view of the truck tonneau cover assembly of the invention;

FIG. 4 is a partially broken away top plan view of the cover assembly taken along the direction of line 4—4 in FIG. 2;

BEST MODE FOR CARRYING OUT THE INVENTION

Figure 1:
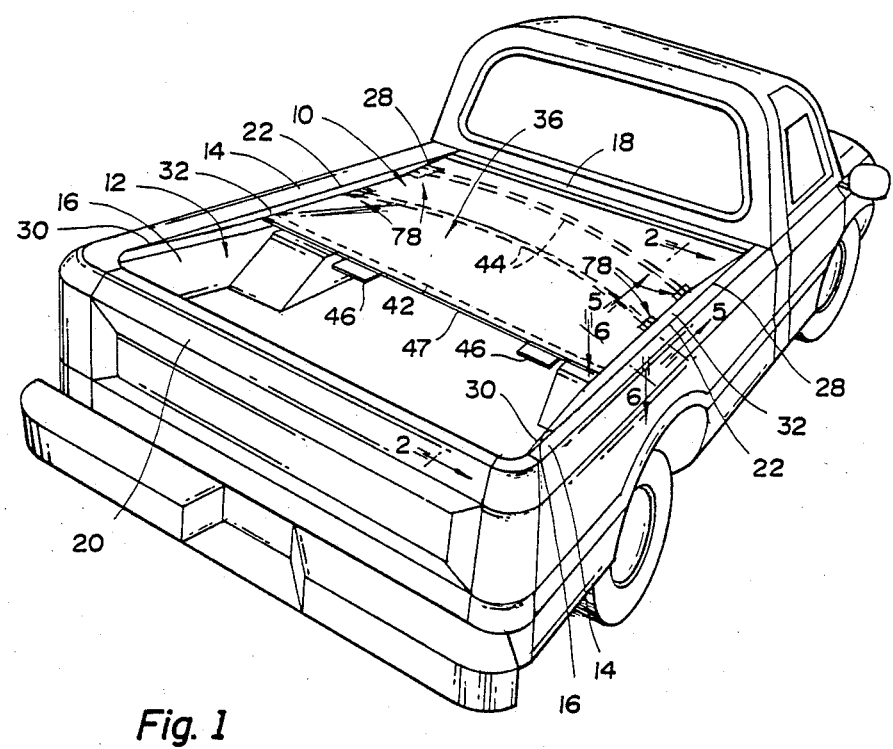
FIG. 1 is a perspective view taken from above and the rear at one side of a truck which includes a tonneau cover assembly constructed in accordance with the present invention.

With reference to FIG. 1 of the drawings, a truck tonneau cover assembly of this invention is indicated by 10 and functions to provide opening and closing of a truck bed 12. This truck bed 12 is of the conventional type including lateral sides 14 provided by side walls 16, a front wall 18, and a rear tailgate 20. As is hereinafter more fully described, the cover assembly 10 is movable between a rolled storage position adjacent the front wall 18 and an unrolled use position closing the truck bed 12 with a construction that sheds water as well as sealing the truck bed from intrusion of the shed water adjacent the lateral sides 14.

Figure 2:
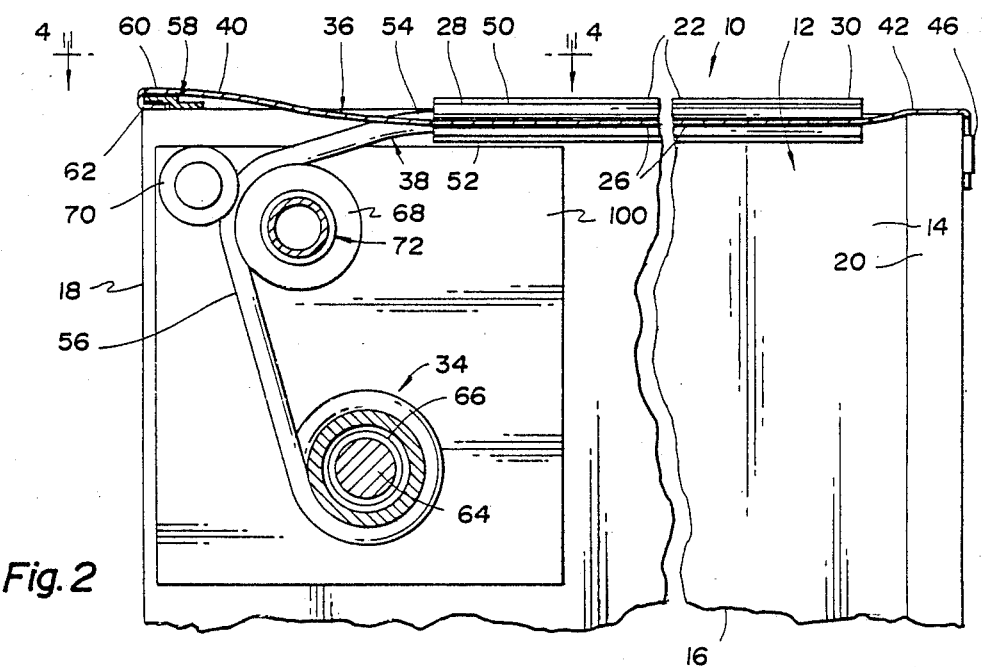
FIG. 2 is a broken away sectional view of the cover assembly taken along the direction of line 2—2 in FIG. 1.
Figure 5:
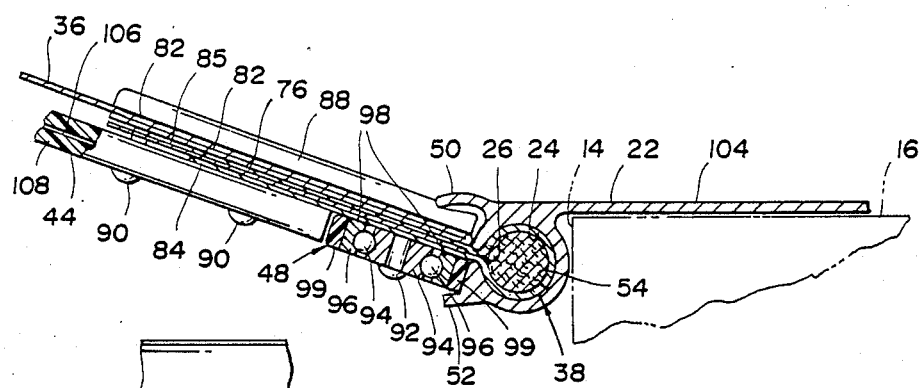
FIG. 5 is a sectional view taken along the direction of line 5—5 in FIG. 1 to illustrate the construction of slat end connections that cooperate in mounting enlarged side edges of the cover on elongated guides of the cover assembly.

With combined reference to FIGS. 1, 3, and 5, the cover assembly 10 includes a pair of elongated guides 22 that are respectively mountable on the truck bed sides so as to extend forwardly and rearwardly generally between the front wall and the tailgate of the truck bed. As shown in FIG. 5, each guide 22 has an elongated groove 24 extending along its length and an inwardly oriented restricted slot 26 into the groove. As best shown in FIGS. 1 and 2, each guide has a front end 28 where the groove and slot thereof extend outwardly in a forward direction adjacent the front wall of the truck bed. Each guide 22 also has a rear end 30 located generally adjacent the tailgate 20 as shown in FIG. 1. The guides 22 have intermediate portion 32 which are located closer to each other than the front ends 28 of the guides. Adjacent the front guide ends 28, a storage roll 34 of the cover assembly is mountable adjacent the front wall 18 of the truck bed as is hereinafter more fully described.

Figure 6:
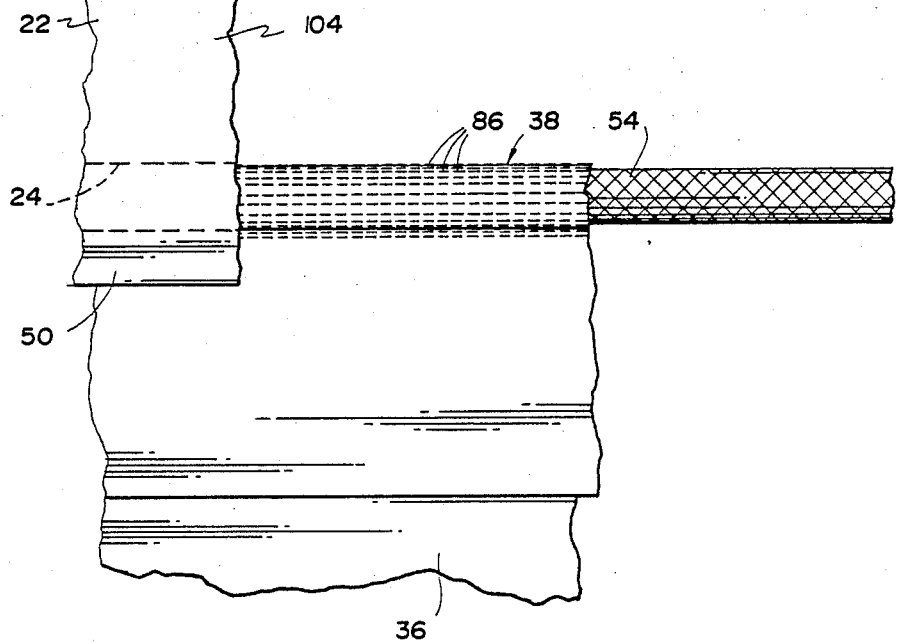
FIG. 6 is a top plan view taken along the direction of line 6—6 in FIG. 1 to illustrate the construction of cover side edge reinforcers and cords that also cooperate in mounting of the cover on the elongated guides.

A flexible sheet like cover 36 of the cover assembly 10 is shown in FIG. 1 and, as best illustrated in FIGS. 3, 5 and 6, has enlarged side edges 38 that are respectively received within the grooves 24 (FIG. 5) of the guides 22 with the cover extending through the guide slots 26 so as to be supported for movement by the guides in a sealed relationship. This cover 36 is preferably made as a vinyl covered fabric so as to be strong and waterproof. As shown in FIG. 2, the cover 36 has a front edge 40 which as is hereinafter more fully described is rolled up on the storage roll 34 to store the cover and open the truck bed. Cover 36 also has a rear edge 42 that is pulled rearwardly to unroll the stored cover and thereby close the truck bed 12. Bendable slats 44 of the cover assembly 10 extend laterally between the side edges 38 of the cover 36 with sufficiently long lengths so as to be bowed upwardly between the intermediate portions 32 of the guides 22 in order to curve the cover upwardly so as to shed water.

As is apparent from the above description, the cover 36 is curved upwardly by the slats 44 upon rearward movement of the slats along the converging front ends of the guides 22 so as to thereby provide the upwardly curved cover shape that sheds water. Furthermore, the enlarged side edges 38 of the cover as shown in FIG. 5 in cooperation with the groove and slot construction of the guides 22 for receiving these enlarged cover edges provide a sealing of the cover assembly so as to prevent intrusion of the shed water into the truck bed.

As best shown in FIG. 3, the guides 22 have the rear ends 30 thereof extending outwardly in a rear direction such that the rear edge 42 of the closed cover is straight in the closed position. This straight shape of the rear cover edge 42 in the closed position facilitates sealing with the upper edge of the tailgate 20. As shown in FIG. 2, any suitable type of retention such as the schematically illustrated buckle type retainer device 46 may be utilized to secure the rear cover edge 42 to the tailgate 20 in the closed position of the cover. At its rear edge, the cover 36 preferably has a slat 47 of a shorter length than the slats 44 so as to be capable of maintaining a straight shape during movement between the storage and use positions. The ends of this shorter slat 47 do not need to ride in the guides 22 since this slat functions only to distribute the force applied to the cover during its opening and closing movement.

As shown in FIGS. 3 and 5, the cover assembly also includes antifriction bearings 48 that mount the slats 44 on the guides for forward and rearward movement along the truck bed. Each guide 22 as illustrated in FIG. 5 preferably includes upper and lower flanges 50 and 52 above and below the restricted slot 26 of the guide. These flanges 50 and 52 guide the antifriction bearings 48 of the slats as is hereinafter more fully described in order to facilitate the unrolling of the cover 36 for use and its rolling for storage.

As best illustrated in FIGS. 2, 4, and 5, the enlarged side edges 38 of the cover 36 preferably include cords 54 that are received within the grooves 24 of the guides 22 in order to provide the movably supported and sealed relationshp of the cover 36 on the truck bed. These cords 54 as shown in FIG. 2 and 4 have front ends 56 that are separated from the side edges 48 of the cover 36 adjacent its front edge 40. These separated front ends 56 of the cords 54 extend to the storage roll 34 for winding and unwinding with respect thereto upon rolling and unrolling of the cover 36. A retainer 58 of the cover assembly is mounted in any suitable manner on the top edge of the front wall 18 and has a flange 60 that receives a folded front edge portion 62 of the front edge 40 of the cover 36 with the cover unrolled to thus close the truck bed. The front cover edge portion 62 is pulled forwardly so as to be released from the retainer flange 60 and thereby allows the front cover edge 40 to be manually moved downwardly and rolled around the storage roll 34 for storage. As shown in FIG. 3, the storage roll 34 includes a winding mechanism 63 including an axle rod 64 that extends through the storage roll 34, axle bearings 65 that mount the ends of the axle rod and the storage roll, and a winding spring 66 that biases the storage roll in the winding direction of the cover in order to overcome most of the friction involved with moving the cover to the rolled storage position.

As shown by continued reference to FIG. 3, the cover assembly includes pairs of first and second guide rolls 68 and 70 mountable on each lateral side of the truck bed adjacent its front wall. As shown in FIG. 2, the front end of each cord 54 extends between flanges of the associated pair of guide rolls 68 and 70 to the storage roll 34 for winding thereon and unwinding therefrom upon movement of the cover between the wound storage position and the unwound use position as previously described. A positioning roll 72 of the assembly preferably extends between the guide roll 68 of each pair as best illustrated in FIG. 3. This positioning roll 72 has a central positioning disc 74 that flexes the cover slats 44 in an upward direction upon rearward movement along the front ends 28 of the guides 22. Such flexing insures that the cover is properly positioned in the upwardly curved direction in the unrolled use position.

With reference to FIG. 3, the cover preferably includes a pair of side edge reinforcements 76 that attach the cords 54 to the cover. The slats 44 have end connections 78 secured to the cover at the edge reinforcements 76. Also, the anifriction bearings 48 of the slats are mounted by the end connections 78 thereof for movement along the guides.

As shown in FIG. 5, each side edge reinforcement 76 has upper and lower flaps 82 and 84 whose outboard ends extend through the restricted slot 26 of the associated guide 22 and around the cord 54 to provide the cord securement. Suitable stitching through the reinforcement flaps 82 and 84, through a back folding of the cover edge, and through a plastic reinforcement sheet 85 provides securement along the entire lateral edge with which the reinforcement is associated.

With reference to FIG. 6, each edge reinforcement 76 of the cover includes plastic 86 that is disclosed as being provided by Teflon stitching along the edge reinforcement. Such plastic facilitates sliding of the cover edges within the grooves 24 of the guides 22 as illustrated in FIG. 5 and thereby reduces the force required to move the cover between the rolled storage position and the unrolled use position.

As best illustrated in FIG. 3, the slats 44 are located below the cover 36 and have ends secured by the end connections 78 to the cover edges of the edge reinforcements. Each slat end connection 78 includes a connection member 88 located above the cover 36 and at least one connector 90, and preferably a pair of such connectors 90, extending from the connection member through the adjacent cover side edge to the associated slat end as shown in FIG. 5. Another connector 92 of each slat end connection 78 extends from the connection member 88 through the adjacent cover side edge and edge reinforcement to the antifriction bearing 48 to provide support for its inner race 94 which supports roller elements 96 on which the outer race 98 of the bearing is supported. This outer bearing race 98 has an outer annular cover 99 of plastic in rolling contact with the guide 22 adjacent its lower flange 52 and is positioned by the cooperation of the upper and lower flanges 50 and 52 of the guide as previously discussed.

As illustrated in FIGS. 2 and 3, the cover assembly includes a pair of support plates 100 that are mounted in any suitable manner on the truck bed side walls 16 adjacent the front wall 18. These support plates mount the storage roll 34 and the positioning roll 72 as well as providing rotatable support for the guide rolls 68 and 70 as previously described. As previously mentioned, the preferred construcction has the guide rolls 68 on the pair of support plates mounting the opposite ends of the positioning roll 72. Furthermore, the opposite ends of the storage roll 34 are rotatably supported by mounts 102 (FIG. 3) on the support plates 100 below and to the rear of the guide rolls 68 and 70.

Each of the guides 22 is preferably manufactured as an extrusion of aluminum or plastic with the cross section illustrated in FIG. 5. This cross section of the extruded aluminum guide includes a support arm 104 for providing mounting thereof on the upper end of the associated truck bed side wall 16. After the extrusion, each guide 22 is bent to form its front and rear ends 28 and 30 as previously described and the support arm 104 is then cut to provide a straight outer edge 105 as illustrated in FIG. 3. It should also be mentioned that the converging angle of the guide ends with respect to each other is limited by the degree of stretchability of the flexible cover with respect to the curvature of the slats so the cover is not prohibited from moving to the closed position.

As shown in FIG. 5, each slat is preferably made of glass fibers 106 embedded in a synthetic resin 108 to provide a lightweight construction that is nevertheless of relatively high strength.

While the best mode for carrying out the invention has been described in detail, it should be appreciated that other embodiments for practicing the invention will be apparent to those skilled in the art to which the invention relates as defined by the following claims.

What is claimed is:

1. A truck tonneau cover assembly for opening and closing a truck bed of the type having side walls defining lateral sides, a front wall, and a rear tailgate, the tonneau cover assembly comprising: a pair of elongated guides respectively mountable on the truck bed sides so as to extend forwardly and rearwardly generally between the front wall and the tailgate; each guide having an elongated groove extending along its length and an inwardly oriented restricted slot into the groove; each mounted guide having a front end where the groove and slot thereof extend outwardly in a forward direction and also having a rear end; the mounted guides each having an intermediate portion; said intermediate portions of the mounted guides being located closer to each other than the front ends of the guides; a storage roll mountable adjacent the front wall; a flexible sheet like cover having enlarged side edges that are respectively received within the grooves of the guides with the cover closely extending through the restricted slots so as to be supported for movement by the guides in a sealed relationship; the cover having a front edge that is rolled up on the storage roll to store the cover and open the truck bed; the cover having a rear edge that is pulled rearwardly to unroll the stored cover and thereby close the truck bed; bendable slats that extend laterally between the side edges of the cover with longer lengths than the spacing between the intermediate portions of the mounted guides; and means extending generally from one mounted guide to the other mounted guide and operable to bow the slats upwardly upon rearward slat movement along the guides in order to curve the closed cover upwardly so as to shed water.

2. A cover assembly as in claim 1 wherein the mounted guides have the rear ends thereof extending outwardly in a rearward direction such that the rear edge of the closed cover is straight in the closed position.

3. A cover assembly as in claim 1 or 2 further including antifriction bearings that mount the slats on the guides for forward and rearward movement along the truck bed.

4. A cover assembly as in claim 3 wherein each guide inlcudes upper and lower flanges above and below the restricted slot thereof to guide the antifriction bearings of the slats.

5. A cover assembly as in claim 3 wherein the enlarged side edges of the cover include cords received within the grooves of the guides.

6. A cover assembly as in claim 5 wherein the cords have front ends that are separated from the side edges of the cover adjacent its front edge, the front ends of the cords extending to the storage roll, a retainer that is mountable on the front wall of the truck bed to secure the front edge of the closed cover, and the front edge of the cover being releasable from the retainer to permit rolling storage thereof on the storage roll along with the cords.

7. A cover assembly as in claim 6 further including a pair of guide rolls mountable on each lateral side of the truck bed adjacent the front wall, and the front end of each cover cord extending between the associated guide rolls to the storage roll.

8. A cover assembly as in claim 7 wherein said means includes a positioning roll that extends between one guide roll of each pair, and the positioning roll having a central positioning disc that flexes the slats in an upward direction upon rearward movement along the front ends of the guides.

9. A cover assembly as in claim 5 wherein the cover includes a pair of side edge reinforcements that attach the cords, the slats having end connections secured to the cover at the edge reinforcements, and the antifriction bearings of the slats being mounted by the end connections thereof for movement along the guides.

10. A cover assembly as in claim 9 wherein each edge reinforcement includes plastic that facilitates sliding of the cover edges within the grooves of the guides.

11. A cover assembly as in claim 9 which the slats are located below the cover and have ends secured by the end connections to the cover edges at the edge reinforcements.

12. A cover assembly as in claim 11 wherein each slat end connection includes a connection member located above the cover and at least one connector extending from the connection member through the adjacent cover side edge and edge reinforcement to the associated slat end, and another connector of each slat end connection extending from the connection member through the adjacent cover side edge and edge reinforcement to the antifriction bearing of the associated slat end connection to mount the bearing.

13. A cover assembly as in claim 12 wherein each elongated guide is manufactured as an extrusion including an upper and lower flanges that engage the slat end connections of the slats to control the extent of slat flexing and thereby position the antifriction bearings with respect to the guides.

14. A cover assembly as in claim 1 or 2 wherein said means includes a positioning roll mountable between the side walls of the truck bed adjacent the front wall thereof and having a central positioning disc that flexes the slats in an upward direction upon rearward movement along the front ends of the guides.

15. A cover assembly as in claim 14 further including a pair of support plates that mount the storage roll and the positioning roll.

16. A cover assembly as in claim 1 or 2 wherein each elongated guide is an aluminum extrusion.

17. A cover assembly as in claim 1 or 2 wherein each slat is made of glass fibers embedded in synthetic resin.

18. A truck tonneau cover assembly for opening and closing a truck bed of the type having side walls defining lateral sides, a front wall, and a rear tailgate, the tonneau cover assembly comprising: a pair of elongated guides respectively mountable on the truck bed sides so as to extend forwardly and rearwardly generally between the front wall and the tailgate; each guide having an elongated groove extending along its length and an inwardly oriented restricted slot into the groove; each mounted guide having a front end where the groove and slot thereof extend outwardly in a forward direction and also having a rear end where the groove and slot thereof extend outwardly in a rearward direction; the mounted guides each having an intermediate portion; said intermediate portions of the mounted guides being located closer to each other than the front and rear ends of the guides; a storage roll mountable adjacent the front wall; a flexible sheet like cover having enlarged side edges including attached cords that are respectively received within the grooves of the guides with the cover closely extending through the restricted slots so as to be supported for movement by the guides in a sealed relationship; the cover having a front edge that is rolled up on the storage roll to store the cover and open the truck bed; the cover having a rear edge that is pulled rearwardly to unroll the stored cover and thereby close the truck bed; bendable slats that extend laterally between the side edges of the cover with sufficiently long lengths so as to be bowed betwen the intermediate portions of the mounted guides; means extending generally from one mounted guide to the other mounted guide and operable to bow the slats upwardly upon rearward slat movement along the guides in order to curve the closed cover upwardly so as to shed water; and antifriction bearings that mount the slats for movement along the guides.

19. A truck tonneau cover assembly for opening and closing a truck bed of the type having side walls defining lateral sides, a front wall, and a rear tailgate, the tonneau cover assembly comprising: a pair of elongated guides respectively mountable on the truck bed sides so as to extend forwardly and rearwardly generally between the front wall and the tailgate; each guide having an elongated groove extending along its length and an inwardly oriented restricted slot into the groove; each mounted guide having a front end where the groove and slot thereof extend outwardly in a forward direction and also ahving a rear end where the groove and slot thereof extend outwardly in a rearward direction; the mounted guides each having an intermediate portion; said intermediate portions of the mounted guides being located closer to each other than the front and rear ends of the guides; a storage roll mountable adjacent the front wall; a flexible sheet like cover having side edges including edge reinforcers and cords secured by the edge reinforcers so as to provide enlarged side edges with respect to the rest of the cover; the enlarged side edges of the cover being respectively received within the grooves of the guides with the cover closely extending through the restricted slots so as to be supported for movement by the guides in a sealed relationship; the cover having a front edge that is rolled up on the storage roll to store the cover and open the truck bed; the cover having a rear edge that is pulled rearwardly to unroll the stored cover and thereby close the truck bed; bendable slats that extend laterally between the side edges of the cover with sufficiently long lengths so as to be bowed between the intermediate portions of the mounted guides; a positioning roll that is mountable between the side walls of the truck bed adjacent the front wall thereof and has a central positioning disc that flexes the slats in an upward direction upon rearward movement along the front ends of the guides upon unrolling from the storage roll whereby the closed cover curves upwardly so as to shed water; and antifriction bearings that mount the slats for movement along the guides.

20. A truck tonneau cover assembly for opening and closing a truck bed of the type having side walls defining lateral sides, a front wall, and a rear tailgate, the tonneau cover assembly comprising: a pair of elongated guides respectively mountable on the truck bed sides so as to extend forwardly and rearwardly generally between the front wall and the tailgate; each guide having an elongated groove extending along its length and an inwardly oriented restricted slot into the groove; each mounted guide having upper and lower flanges respectively located above and below the restricted slot thereof; each mounted guide also having a front end where the groove and slot thereof extend outwardly in a forward direction and also having a rear end where the groove and slot thereof extend outwardly in a rearward direction; the mounted guides each having an intermediate portion; said intermediate portions of the mounted guides being located closer to each other than the front and rear ends of the guides; a pair of support plates mountable on the side walls of the truck bed adjacent the front wall thereof; each support plate including a pair of guide rolls; a storage roll mounted by the support plates adjacent the front wall; a flexible sheet like cover having side edges including edge reinforcers and cords secured by the edge reinforcers so as to provide enlarged side edges with respect to the rest of the cover; the enlarged side edges of the cover being respectively received within the grooves of the guides with the cover closely extending through the restricted slots so as to be supported for movement by the guides in a sealed relationship; each cover reinforcer including plastic that facilitates movement thereof within the associated guide groove; the cover having a front edge that is rolled up on the storage roll to store the cover and open the truck bed; a retainer for securing the front edge of the unwound cover to the front wall of the truck bed; the cover having a rear edge that is pulled rearwardly to unroll the stored cover and thereby close the truck bed; the cords being separated from the side edges of the cover adjacent the front edge thereof and extending between the pair of guide rolls of the adjacent support plate to the storage roll for winding and unwinding with respect thereto upon winding and unwinding of the cover; bendable slats that extend laterally between the side edges of the cover with sufficiently long lengths so as to be bowed between the intermediate portions of the guides; a positioning roll mounted on the support plates adjacent the front wall of the truck bed and having a central positioning disc that flexes the slats in an upward direction upon rearward movement along the front ends of the guides upon unrolling from the storage roll whereby the closed cover curves upwardly so as to shed water; and antifriction bearings that mount the slats for movement along the guides while the upper and lower flanges of the guides position the antifriction bearings and the slats.

* * * * *